July 11, 1939.   G. F. KOTRBATY   2,166,098
ANGULAR STRUCTURAL UNIT AND ASSEMBLY
Original Filed Oct. 1, 1935
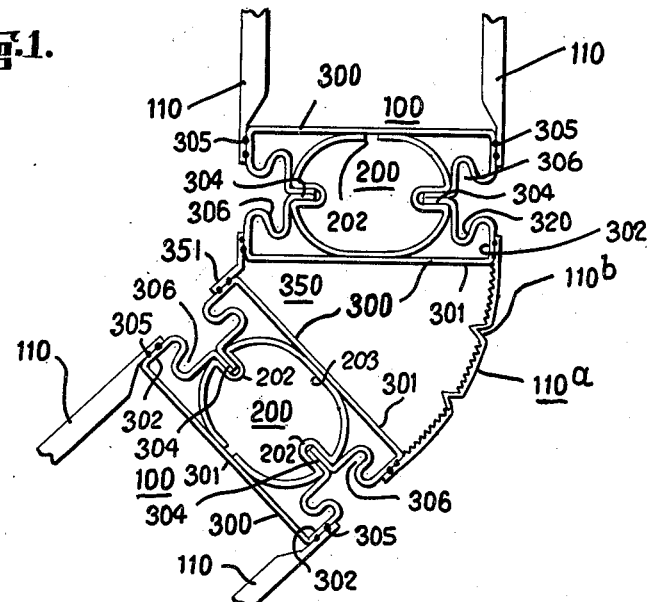
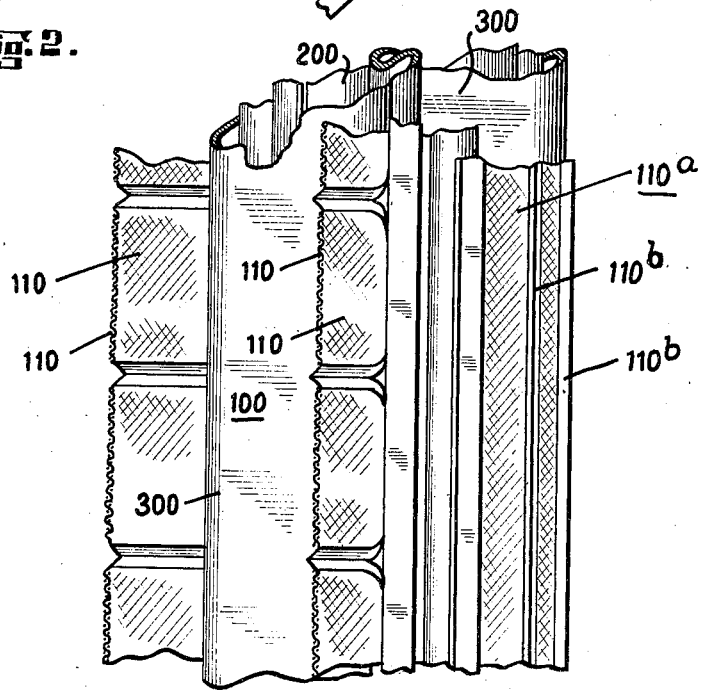
INVENTOR
Guy F. Kotrbaty
BY
Frederick A. Norton
ATTORNEY Patented July 11, 1939

2,166,098

UNITED STATES PATENT OFFICE 2,166,098

ANGULAR STRUCTURAL UNIT AND ASSEMBLY

Guy F. Kotrbaty, Chestnut Hill, Pa., assignor to Ferrocon Corporation, Bryn Mawr, Pa., a corporation of Delaware Original application October 1, 1935, Serial No. 43,017. Divided and this application October 4, 1937, Serial No. 167,245

2 Claims. (Cl. 189—34)

This invention relates to improvements in building construction systems and elements therefor.

This application is a division of my application Ser. No. 43,017, filed Oct. 1, 1935, for Composite building construction units and supporting members, allowed January 21, 1937, and issuing as Patent No. 2,094,607, on October 5, 1937.

The improvements of the present invention relate more in detail to modified structural supporting and keying members and self-supporting structural wall members of the type described generally in my Patent No. 1,968,045 of July 31, 1934, and Patent No. 1,965,601, of July 10, 1934, and cognate applications and patents, Patent No. 2,017,441, of October 15, 1935; Patent No. 1,987,115, of January 8, 1935; Patent No. 1,995,477, of March 26, 1935; Patent No. 1,993,791, of March 12, 1935, and application Ser. No. 29,820, allowed April 30, 1937.

The present invention is particularly directed to angular wall joints and elements therefor, and to structural assemblies including the same.

In addition the novel improvements of the present invention include provision for the utilization of preformed panelling of various types, with or without the use of associated structural hardenable plastic materials bonded and applied to supporting panel members.

These and other desirable features will be described in the accompanying specification and illustrated in the drawing, certain preferred forms being shown by way of illustration only, for, since the underlying features may be incorporated in other specific structural assemblies, it is not intended to be limited to the ones here shown, except as such limitations are clearly imposed by the appended claims.

In the drawing, like numerals refer to similar parts throughout the several views, of which Fig. 1 is a horizontal section through an angle unit for corners and associated wall units, and Fig. 2 is an elevation, partly in section, of the vertical aspect of the structure shown in Fig. 1.

Angular wall sections or joints, as contemplated in the present invention, may be formed by attaching an angular guide or base member 351 to one side of each of a pair of abutted channel-shaped stud and keyway members to space them in a desired angular relation. The space between the legs formed by the stud sections 301 may be closed by panel members 110a of suitable material and desirably of ribbed lath, with the ribs 110b extending vertically. The angular structural unit 350, thus formed, may be secured in and between wall units 100 to give an angular wall section.

The wall units and associated keying and locking stud members with which the angular units 350 may be associated include composite structural stud and key members. The stud members form end sections of wall units and are joined together and held by the key members. The key members 200, are of generally tubular shape, and are provided with a continuous longitudinal slot 201 on one side thereof. The key members 200 are also provided with diametrically opposed, external longitudinal channels 202 coextensive in length therewith. The side walls, 203, of the keying members 200 may be flat, as shown, or they may have a plurality of circular or partially circular shapes.

The keying members are adapted to lock end sections 300 of self-supporting units 100 formed of spaced panel members 110, secured in any desired manner to the end sections. The improved end sections 300 comprise channel members having a body or base portion 301, side flanges 302 provided with a double bend 320 forming parallel side walls 303 which terminate in inturned edge members 304 substantially parallel to the base member 301. The members 304 are adapted to be fitted in and engaged by the channel portions 202 of the keying members. It will be seen that when a pair of abutted building units 100 have their respective gripping or locking flanges 304 abutted together, that a keying member 200 may be slid in place between the end sections, 300, of the units, the sections 304 of the end members being fitted in and locked by the channels 202 of the keys. Due to the accordion pleat formation of the folds or sections 320 of the inturned sides of members 300, a desired spring grip action is assured, and the keys and abutted spring grip flanges usually coact to hold each other together in a positive, locked relation.

The panel members 110 of the self-supporting unit members, 100, may, as indicated above, be secured to or fastened on to the spacing end section or parallel keyways in any suitable manner, as by welding, brazing, soldering, or they may be riveted, clipped, bolted or screwed and wired, all as indicated generally at 305. The panels 110 may comprise sheet members of a variety of materials such as structural plastic materials including phenolic condensation products of the type known commercially under the trade name of "Bakelite", gypsum plastics, concrete sheet members, enameled metal plate members, composition wall board panels, expanded or pressed metal lath or paper-backed wire lath, and sheet metal members of various gauges, depending upon the structural strength desired and the finish to be secured. These materials may also be used in combination with a backing or surfacing of aluminum foil, or any other insulating material, such as Celotex, Mafia grass board, Masonite, mineral or glass wool, Bakelite-impregnated paper, or paper-base materials. In addition, where hardenable plastic materials such as the lime plasters, gypsum plasters, and the like, are to be applied as wall finishes, the panel members 110 may comprise, as noted above, ribbed, plain, expanded, or pressed sheet metal.

The combination of the improved keys 200 with the novel spacing supports 300 permits the formation of improved structural members forming composite studs and stanchions in the angular joint connections herein, the several parts of which coact to support each other and to form strong sustaining members. A desirable feature of this construction, and one of marked utility in building, resides in the fact that certain of the structural composite stud members may be incorporated as end sections of self-supporting units for use in angles of building walls, which units are adapted to be preformed and can be assembled readily in place in a building, being permanently secured by the key members 200, which, in themselves form tubular or substantially tubular structural supporting members. Thus, it will be seen that each of the sections of the composite stud structure exerts its own supporting function in the composite, and that no part of the composite structures can be considered or classed as non-load-supporting members.

It will be appreciated now that there has been provided an improved building construction, including novel angular composite building units and composite stud and support members. In addition, there have been provided novel mechanical means for keying and joining wall units together in an angular, mechanically rigid joint, and in a simple yet efficient manner, and in which the various parts and elements are adapted to be abutted and quickly and permanently secured. The novel improvements of the present invention also include an improved method for assembling novel structural parts of the present invention.

The various features and combinations of structural parts have been shown herein by way of illustration only, and it is intended to claim all parts as broadly novel, particularly in their new combinations, insofar as the state of the art will allow.

What is claimed is:

1. A building construction, including an array of self supporting building units and having wall sections formed of abutted units, including spaced panel sections and end stud sections of everted channel shape having inturned spring gripping flanges and keying members in engagement with gripping flanges of juxtaposed units, the panel members of the units including horizontal ribbed sections imparting structural strength and rigidity thereto; angular joint units associated with and joined to wall units, the angular units including an angular structural member forming one face of the unit and a panel member of greater width than angular member forming the other face of the angular unit, the said panel member being vertically ribbed to permit bending through any arc.

2. In building units for non-rectilinear wall constructions comprising an angular structural member forming one face of a unit, a panel member of greater projected width than the angular member and forming the other face of the unit, and channel-shaped stud sections of composite stud members secured across and spacing the edges of the face members, the improvements comprising vertically ribbed panel members.

GUY F. KOTRBATY.